Figure 1:
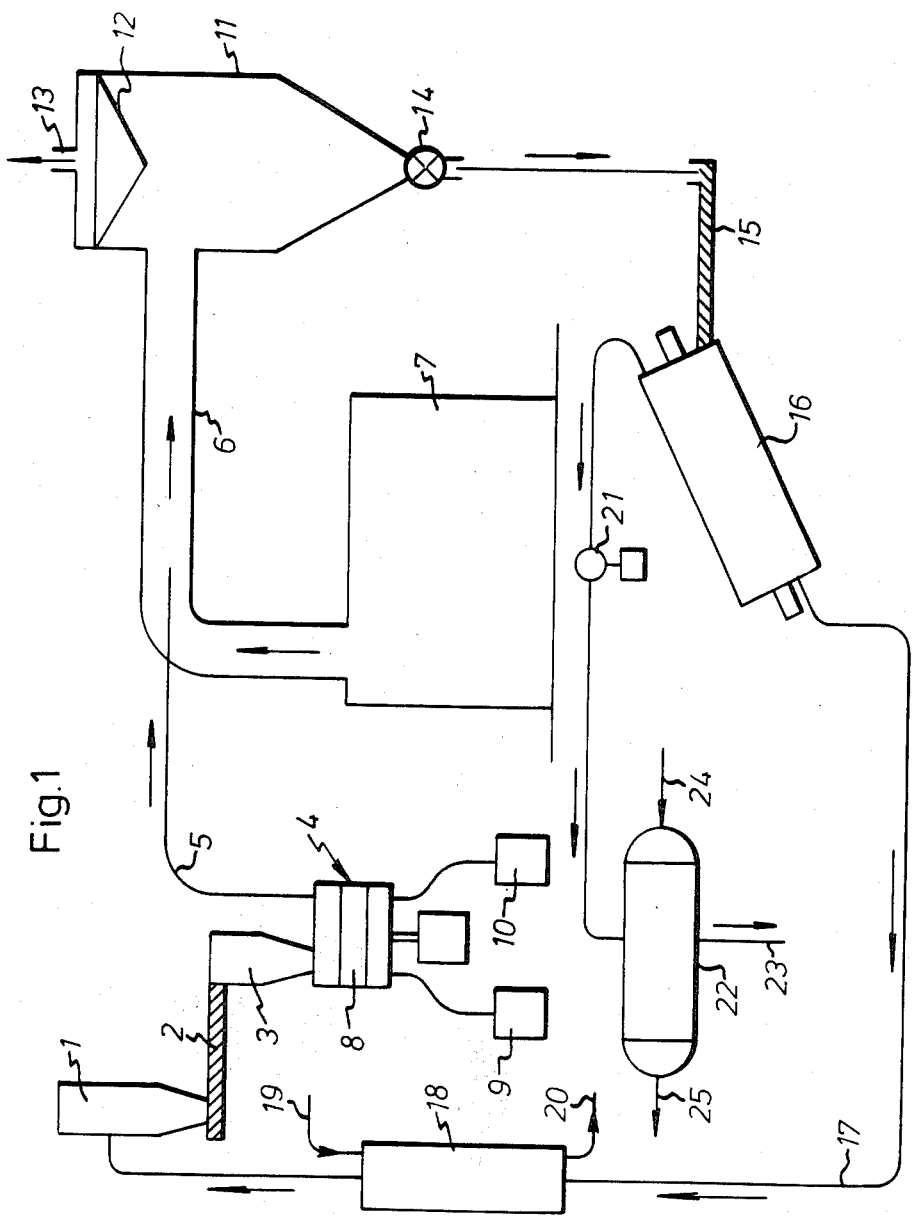

United States Patent [19]
Åbom

[11] Patent Number: 4,728,342
[45] Date of Patent: Mar. 1, 1988

[54] PROCESS FOR SEPARATING SUBSTANCES IN THE EVAPORATED STATE FROM AIR AND/OR GAS MIXTURES

[76] Inventor: Jan J. V. Åbom, 12, Poppelgatan, S-421 74 Västra Frölunda, Sweden

[21] Appl. No.: 6,786

[22] Filed: Jan. 27, 1987

[30] Foreign Application Priority Data

Jan. 29, 1986 [SE] Sweden .................... 8600395

[51] Int. Cl.$^4$ ............................ B01D 53/10
[52] U.S. Cl. ............................ 55/59; 55/68; 55/74; 55/262; 55/316
[58] Field of Search ............. 55/59, 68, 74, 262, 55/316

[56] References Cited

U.S. PATENT DOCUMENTS

| | | | |
|---|---|---|---|
| 3,798,877 | 3/1974 | Lamb | 55/316 X |
| 3,892,543 | 7/1975 | Margraf | 55/262 X |
| 3,981,277 | 9/1976 | Åbom | 123/23 |
| 4,319,890 | 3/1982 | Teller et al. | 55/262 X |
| 4,534,778 | 8/1985 | Carré et al. | 55/262 X |

FOREIGN PATENT DOCUMENTS 836282 6/1960 United Kingdom .

*Primary Examiner*—Kathleen J. Prunner
*Attorney, Agent, or Firm*—Shapiro and Shapiro

[57] ABSTRACT

The present invention relates to a process for separating substances, such as solvents, polyaromatic hydrocarbons, sulphur dioxide ($SO_2$) and/or nitrogen compounds ($NO_x$), in the evaporated state from air and/or gas mixtures, by supplying to the air or gas mixture adsorbing powder which, after adsorption, is separated from the air or gas mixture and liberated from adsorbed substances and then reused.

The novel matter of the invention resides in that the adsorbing powder is supplied pulsewise in finely divided form, whereby the agglomeration tendency of the powder particles is eliminated.

6 Claims, 2 Drawing Figures

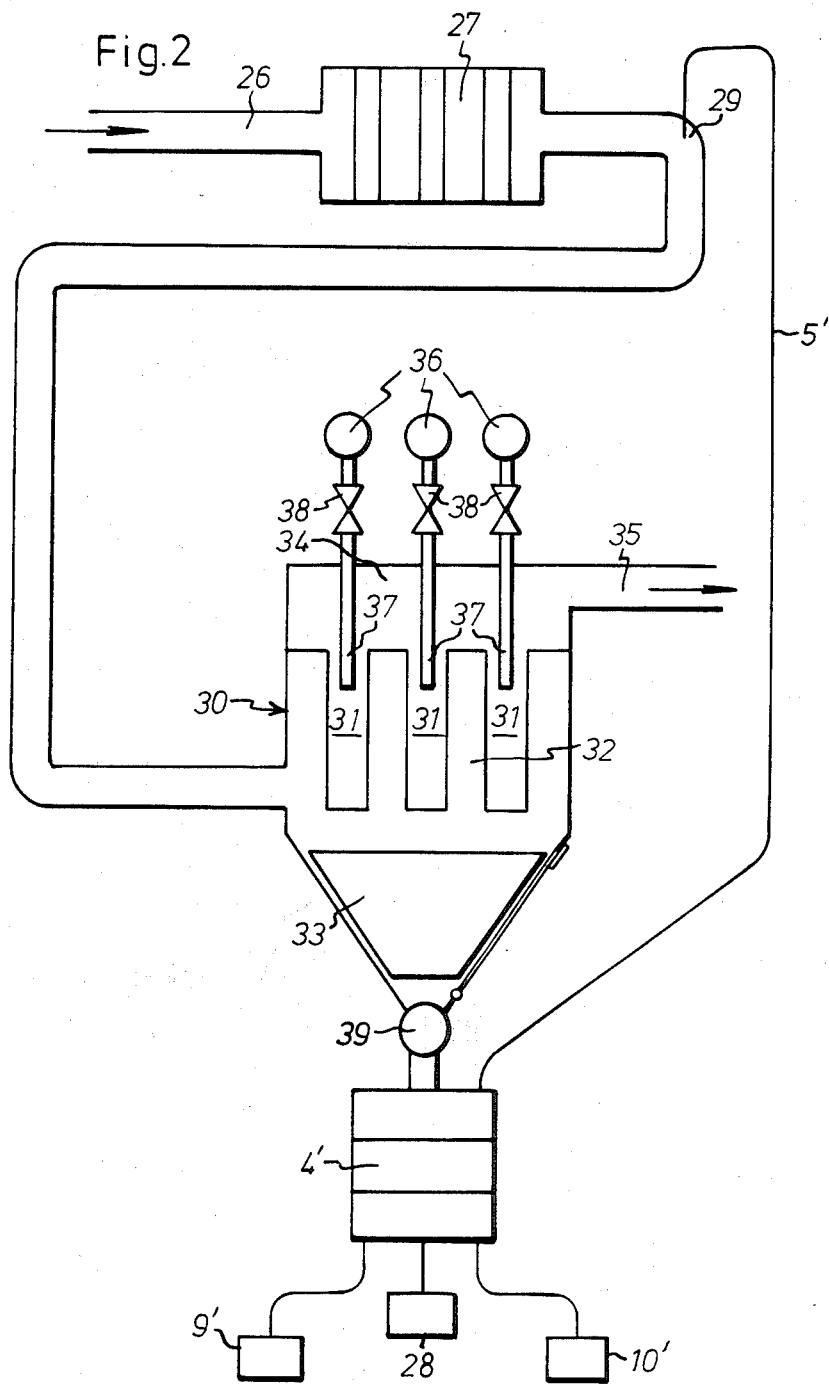

PROCESS FOR SEPARATING SUBSTANCES IN THE EVAPORATED STATE FROM AIR AND/OR GAS MIXTURES

The present invention relates to a process for separating substances, such as solvents, polyaromatic hydrocarbons, sulphur dioxide and/or nitrogen compounds, in the evaporated state from air and/or gas mixtures, the air or gas mixture being supplied with adsorbing powder which, after adsorption, is separated from the air or gas mixture, liberated from adsorbed substances, and reused.

Previous attempts at separating substances of the above-mentioned type from air or gas mixtures by means of a powder, preferably carbon powder and zeolite, have not had the desired effect, presumably because one could not prevent the powder particles from agglomerating, i.e. adhering to each other. For a successful separation, it is a condition that the powder particles introduced into the air or gas mixture have maximum contact surface. Agglomeration implies that the contact surface is reduced drastically, with the consequence that the powder volume introduced into the air or gas mixture cannot possibly adsorb the desired amount of substances carried by the mixture. In powder technology, it is assumed that van der Waals forces apply. These forces explain how powder particles under different circumstances adhere to each other.

The present invention is based on the insight that van der Waals forces are not generally applicable, and that it is possible, by supplying the powder pulsewise in finely divided form, to counteract and even eliminate the agglomeration tendency of the powder particles, whereby it is ensured that each particle will have maximal contact surface and that maximal adsorption is achieved.

To give the desired effect, the pulses must have a frequency of from 15 to 75, preferably from 50 to 60 pulses per second. By the pulsewise supply, the powder particles which should have a particle size within the range from above 0 to $75\mu$, preferably from above 0 to $10\mu$, in order to obtain maximal contact surface per unit of weight, will be completely separated from one another.

The process according to the invention may be used for a variety of applications.

One application is the separation and recovery of solvents which occur in the evaporated state in the exhaust air from, for example, automotive paint shops. The exhaust air from such plants causes heavy air pollution, and previous attempts at eliminating this problem by burning off the solvents at high temperatures have only led to other types of air pollutants, while causing the solvent volumes to go to waste.

Besides an efficient purification of the exhaust air, the process according to the invention brings the advantage that practically the entire volume of solvent can be recovered for reuse.

Another important application is the purification of exhaust gases from, for example, diesel engines and the like, it being possible to separate $SO_2$, $NO_x$ and polyaromatic hydrocarbons from the exhaust gases.

Embodiments of the invention will be described below in more detail, reference being had to the accompanying drawings in which FIG. 1 illustrates schematically a plant for separating gaseous or vaporous solvent pollutants from the exhaust air from a spray plant; and FIG. 2 illustrates schematically a plant for purifying diesel engine exhaust gases.

FIG. 1 shows a silo or container 1 for the adsorbing powder which has a particle size of from above 0 to $75\mu$, preferably from above 0 to $10\mu$. From the silo 1, the powder is conveyed by means of a screw feeder 2 to a separator 3 for separating stones and larger particles, said separator being connected to an injection mechanism 4 which preferably is of the type supplying the adsorbing powder by pulses through the powder conduit 5 to the discharge pipe 6 for the mixture of air and evaporated solvent from a spray booth 7 in, for example, an automotive spray shop.

The mechanism 4 preferably is of the type disclosed in U.S. Pat. No. 3,981,277. Thus, it comprises a movable part 8 having a pre-chamber which is adapted, during the work cycle of said movable part 8, to successively pass the connection of a vacuum source 9, the separator 3 and the discharge pipe 6 so as to be placed in communication with these means. The vacuum source 9 establishes a subpressure in the pre-chamber, such that adsorbing powder is supplied thereto under the action of the subpressure established therein when the chamber is connected to the separator 3. The injection into the discharge pipe 6 then takes place under the action of a pressure applied to the powder by the compressor 10.

The mixture of air and evaporated solvent flows through the discharge pipe 6 to the dust separator 11 which is equipped with a cyclone. The adsorbing powder is supplied pulsewise in the direction of flow of the mixture in such a way that the solvent is adsorbed to the surface of the powder. 12 is a textile filter, and 13 is the outflow for purified air or gas.

The powder passes through a rotary vane feeder 14 and a screw feeder 15 to a tumbler drier 16 in which the powder is heated so that the solvent leaves the powder in vapor form. The powder thus regenerated is recycled through the conduit 17 to the silo 1, passing the powder cooler 18 for cooling and recovery of heat. Through the pipe 19, cooling water is supplied, and the heated water is discharged through the pipe 20.

The vaporous solvent leaving the tumbler drier 16 is compressed in a compressor 21 and/or cooled in a condenser 22, such that it is converted into liquid form and can be discharged through the pipe 23. After purification and filtration, the solvent is then ready for reuse. Cooling water is supplied through the pipe 24, and the heated water is discharged through the pipe 25.

The power consumption of the process is about 4 kWh per liter of solvent. This heat volume is to be found in the cooling water from the condenser 22 and in the cooling water from the powder cooler 18. The cooling water may preferably be used for heating purposes.

In the context of this invention, the term solvent is to be interpreted to include also such substances as mercaptans and ammonia.

In the application illustrated in FIG. 2, i.e. the purification of diesel engine exhaust gases, it is assumed that the exhaust gases are cooled to a temperature below the one they have when leaving the engine.

In FIG. 2, an exhaust pipe 26 has an exhaust cooler 27 through which water, air or other cooling medium can flow to cool the exhaust gases to about 60° C. As seen in the direction of flow beyond the exhaust cooler, a powder conduit 5' opens into the exhaust pipe from an injection mechanism 4' substantially in accordance with the injection mechanism 4 previously described. The mechanism 4' is driven by a motor 28 and is connected to a vacuum pump or source 9' and a compressor 10'.

Beyond the point of powder injection 29, the exhaust gases are in intimate contact with the powder injected by pulses, and during their passage to a dust filter 30, the powder particles adsorb substances from the exhaust gases. The dust filter comprises a number of filter units 31 in a chamber 32, the lower end of which is connected to a cassette 33 for powder, preferably pulverised activated carbon, said cassette being exchangeably mounted in a housing.

The clean side of the filter units faces a space 34 having a pipe 35 for discharging the purified exhaust gases.

Within each filter unit 31, a compressed air container 36 with nozzles 37 is provided for cleaning the filter units. By instantaneous and preferably automatically controlled supply of compressed air through the valves 38, the filter units can be blown clean in the return direction so that any powder that has collected on the outer side of the filter units is torn loose and drops into the cassette 33.

The cassette 33 which can be replaced when activated carbon powder is saturated with compounds, has at its lower end an opening connected to a rotary vane feeder 39 which permits the discharge of powder without direct open communication between the housing containing the cassette and the supply mechanism 4'.

During operation, powder, activated carbon in powder form, is injected pulsewise into the exhaust pipe where polyaromatic hydrocarbons, $SO_2$ and $NO_x$ are adsorbed to the powder particles, whereupon the powder is separated in the filter units 31 and may be reused until the powder is saturated, whereupon the cassette simply is replaced, for example in connection with refueling.

The cassettes containing saturated carbon powder can be subjected to heat treatment to yield adsorbed substances, and then reused. In principle, a device for continuous powder purification could be included in the exhaust gas purification plant, and the separated substances could be collected in special containers. However, for reasons of handling and space, it is preferred, at least for vehicles, to replace the carbon powder cassette and clean it in stationary plants.

However, where large stationary diesel engine plants are concerned, as well as other types of combustion plants, boilers and the like, a continuously operating carbon powder purifying plant may be disposed between the filter units and the injection mechanism. In such cases it is, of course, also possible to utilise for example cyclone filters or the like, instead of the filter units referred to above.

The invention is not restricted to the embodiments described above and illustrated in the drawings, but may be modified in various ways within the scope of the appended claims.

What I claim and desire to secure by Letters Patent is:

1. A process for separating substances, such as solvents, polyaromatic hydrocarbons, sulphur dioxide ($SO_2$) and/or nitrogen compounds ($NO_x$), in the evaporated state from an air and/or gas mixture, by supplying to said mixture adsorbing powder which, after adsorption, is separated from said mixture and liberated from adsorbed substances and then reused, characterised in that the adsorbing powder is supplied pulsewise in finely divided form, whereby the agglomeration tendency of the powder particles is eliminated.

2. A process as claimed in claim 1, characterised in that the adsorbing powder is supplied by pulses at a frequency of from 15 to 75 pulses per second.

3. A process as claimed in claim 2, characterized in that said frequency is from 50 to 60 pulse per second.

4. A process as claimed in claim 1, characterised in that the adsorbing, finely divided powder has a particle size of from above 0 to 75μ.

5. A process as claimed in claim 4 characterized in that said characterized in that particle size is from above 0 to 10μ.

6. A process as claimed in claim 1 characterized in that the adsorbing powder is supplied to the mixture in one or more conduits through which the mixture is flowing.

* * * * *